(12) United States Patent
Berger et al.

(10) Patent No.: US 7,413,133 B2
(45) Date of Patent: Aug. 19, 2008

(54) WASHING DEVICE FOR A GLASS PANE IN A MOTOR VEHICLE

(75) Inventors: Josef Berger, Wolfschlugen (DE); Bernd Brodbeck, Nufringen (DE)

(73) Assignee: Daimler AG, Stuttgart (DE)

( * ) Notice: Subject to any disclaimer, the term of this patent is extended or adjusted under 35 U.S.C. 154(b) by 231 days.

(21) Appl. No.: 10/530,397

(22) PCT Filed: Sep. 11, 2003

(86) PCT No.: PCT/EP03/10071

§ 371 (c)(1),
(2), (4) Date: Jan. 17, 2006

(87) PCT Pub. No.: WO2004/035359

PCT Pub. Date: Apr. 29, 2004

(65) Prior Publication Data

US 2006/0108447 A1     May 25, 2006

(30) Foreign Application Priority Data

Oct. 9, 2002 (DE) ................. 102 46 979

(51) Int. Cl.
   *B05B 1/10* (2006.01)
   *B60S 1/46* (2006.01)
(52) U.S. Cl. ................. 239/284.1; 239/284.2
(58) Field of Classification Search ........... 239/284.1, 239/284.2, 128, 130, 134, 569, 600; 15/250.01, 15/250.02, 250.04
See application file for complete search history.

(56) References Cited

U.S. PATENT DOCUMENTS 3,017,120 A * 1/1962 Friant et al. ............. 239/117

(Continued)

FOREIGN PATENT DOCUMENTS

DE       29 43 887 A1     5/1981

(Continued)

OTHER PUBLICATIONS

Japanese Office Action dated Jul. 27, 2007 (six (6) pages).

(Continued)

*Primary Examiner*—Davis D Hwu
(74) *Attorney, Agent, or Firm*—Crowell & Moring LLP

(57) ABSTRACT

The invention relates to a washing device for a glass pane in a vehicle, having a washing-water line which runs along the lower edge of the glass pane and at least one washing-water nozzle which is connected to the washing-water line. In order to obtain a reduced installation space for the washing-water device in the vehicle and in order to comply with regulations relating to the protection of pedestrians, the washing-water nozzle comprises an elongate pipe section and an elongate, flat valve housing which is flange-connected to the pipe section and in which are arranged at least one spray opening with an opening axis which runs transverse to the housing axis, and also a non-return valve which is arranged upstream of the spray opening. In order to connect the washing-water nozzle to the washing-water line, the washing-water nozzle is inserted into said washing-water line in an intersection point of the washing-water line such that the pipe section connects to one another two line portions which are produced by the intersection point.

22 Claims, 2 Drawing Sheets

U.S. PATENT DOCUMENTS

| | | | | |
|---|---|---|---|---|
| 6,029,908 | A | * | 2/2000 | Petzold .................... 239/284.1 |
| 6,133,546 | A | * | 10/2000 | Bains ......................... 219/202 |
| 6,393,652 | B1 | * | 5/2002 | Vogt ........................ 15/250.04 |
| 6,513,185 | B1 | | 2/2003 | Zimmer et al. |
| 6,726,122 | B2 | * | 4/2004 | Zimmer .................... 239/284.1 |

FOREIGN PATENT DOCUMENTS

| | | |
|---|---|---|
| DE | 37 09 308 A1 | 10/1987 |
| DE | 92 01 119.5 U | 4/1992 |
| DE | 43 04 661 C2 | 6/1995 |
| DE | 199 13 193 A1 | 10/2000 |
| DE | 199 50 738 A1 | 5/2001 |
| DE | 100 53 684 A1 | 5/2002 |
| JP | 5-62366 | 8/1993 |
| JP | 11-334543 A | 12/1999 |
| JP | 2000-344062 | 12/2000 |
| WO | WO 00/50277 A1 | 8/2000 |
| WO | WO/2000/050277 | 8/2000 |

OTHER PUBLICATIONS

International Search Report dated Dec. 10, 2003 w/English translation (Six (6) pages).

German Office Action dated Jan. 14, 2004 (Four (4) pages).

* cited by examiner

WASHING DEVICE FOR A GLASS PANE IN A MOTOR VEHICLE

BACKGROUND AND SUMMARY OF THE INVENTION

The invention relates to a washing device for a glass pane in a vehicle, in particular for a windshield of a motor vehicle.

DE 92 01 119 U1 discloses a washing device, two ducts which run in the longitudinal direction are provided in a plastic panel which extends over the width of the windshield between the rear edge of the engine hood and the windshield. The ducts each extend from one end of the panel to the center, and each is connected to a washing-fluid feed line by means of a connection nipple. The longitudinal ducts are provided with holes at defined locations. The heated washing-fluid nozzles are each equipped with a non-return valve and are produced in the form of autonomous units. Also, the nozzles each have a connection piece which is inserted into one of the holes in the longitudinal duct such that the spray opening in the washing-fluid nozzle points toward the windshield.

DE 43 04 661 C2 discloses a glass-pane washing system for a motor vehicle, in which the washing-fluid line is formed by a soft, elastic plastic hose which has an approximately pear-shaped profile, in the central region of which runs a flow duct for the washing fluid. At the level of a washing-fluid nozzle, the wall region of the plastic hose is provided with an opening which reaches into the flow duct and whose axis runs radially with respect to the flow duct. A connection pipe which is connected to a nozzle body is inserted into this radial opening. The spray opening is formed in the nozzle body. Two heating conductors are embedded parallel to the flow duct in that region of the wall of the plastic hose which faces away from the radial openings. These heating conductors are connected to a power source and heat up the washing fluid flowing in the flow duct. In addition, the region of the nozzle body is also heated by means of a PTC element.

The invention is based on the object of specifying a washing device for a glass pane in a vehicle, which satisfies the requirement for a reduced installation space and also the regulations relating to the protection of pedestrians.

According to the invention, the object is achieved by a washing device for a glass pane in a vehicle. This washing device preferably includes a washing-fluid line which runs along a lower edge of the glass pane, and a washing-fluid nozzle which is connected to the washing-fluid line. The washing-fluid nozzle may include a spray opening, a non-return valve which is arranged upstream of the spray opening, a pipe section, and a valve housing. The valve housing contains the non-return valve and is connected to the outside of the pipe section with its housing axis parallel to the axis of the pipe section. The spray opening is arranged in the valve housing with its opening normal transverse to the housing axis. The pipe section is inserted into an intersection point of the washing-fluid line.

The washing device according to the invention has the advantage that the at least one washing-fluid nozzle which is produced in the form of an autonomous unit is of very flat construction in spite of the integration of a non-return valve and has a transverse extent which is no greater or is only slightly greater than the external extent of the washing-fluid line. As a result, a multiplicity of washing-fluid nozzles can be very effectively placed in the receptacle which is held at the front of the vehicle, and this receptacle has to provide only one installation space which is adapted to the washing-fluid line. The washing-fluid nozzles of flat construction do not form, in the area surrounding the glass pane, any protruding projections which may potentially injure pedestrians if they collide with the engine hood.

According to one preferred embodiment of the invention, the pipe section and valve housing are produced from a material which conducts heat well, and a continuous, insulated heating wire is laid in the interior of the washing-fluid line. Laying the heating wire into the flow interior of the washing-fluid line which carries the washing fluid may firstly allows the wall of the washing-fluid line to be kept relatively thin, so that a small outside diameter of the washing-fluid line is obtained. Secondly, the heating wire can be led through the pipe section of the washing-fluid nozzle without any problems. This saves both production and assembly costs for an additional heating system of the washing-fluid nozzle, and also saves installation space. The flat construction of the valve housing means that the heating wire laid in this way is situated very close to the spray opening. As a result, in conjunction with the heat-conducting material of the pipe section and valve housing, the region of the spray opening is very effectively heated. An additional PCT heating element, as is used to prevent icing of the spray opening the washing nozzles of the conventional washing system, may be dispensed with, so that a further cost reduction is achieved for the heated washing-fluid nozzle.

According to one advantageous embodiment of the invention, the spray opening is integrated in a separate spray module which is exchangeably inserted in a housing opening in the valve housing whose opening normal or opening axis runs transverse to the housing axis. In this case, the housing opening is preferably surrounded by a collar which is formed on the valve housing and into which the spray module can be clipped. The advantage of this design is that only the spray module needs to be exchanged in order to restore operation of the washing-fluid nozzle when the spray opening is blocked. It is possible to carry out the exchanging process very quickly and conveniently as a result of the spray module simply clipping into the valve housing.

According to one advantageous embodiment of the invention, the washing-fluid line is a flexible hose which has at least two hose sections which are each connected to one another by one pipe section. The hose is placed in a shaft which is open at the top, and has a U-shaped cross section. In the shaft wall, which is relatively close to the glass pane, at least one cutout is provided into which the spray opening projects. The shaft is an integral constituent part of a lower cover which, together with a part of an engine hood which rests on said cover, encloses an air duct. When the engine hood is closed, the shaft is covered by this engine hood from above. This type of integration of the washing device into the vehicle is convenient in terms of assembly and does not require a large installation space. The washing-fluid nozzles which are integrated in the profile of the hose are simply positioned at the existing cutouts in the shaft and are fixed there, with a spraying direction which points through the cutouts.

A washing-fluid nozzle according to one further embodiment of the invention may have a collar which protrudes radially out from the valve housing and serves the purpose of clipping in the spray module. The collar may also be used to positively secure the washing-fluid nozzle in the cutout in the shaft.

The invention is described in more detail in the text which follows with reference to an exemplary embodiment which is illustrated in the drawing.

DETAILED DESCRIPTION OF THE DRAWINGS

Figure 1:
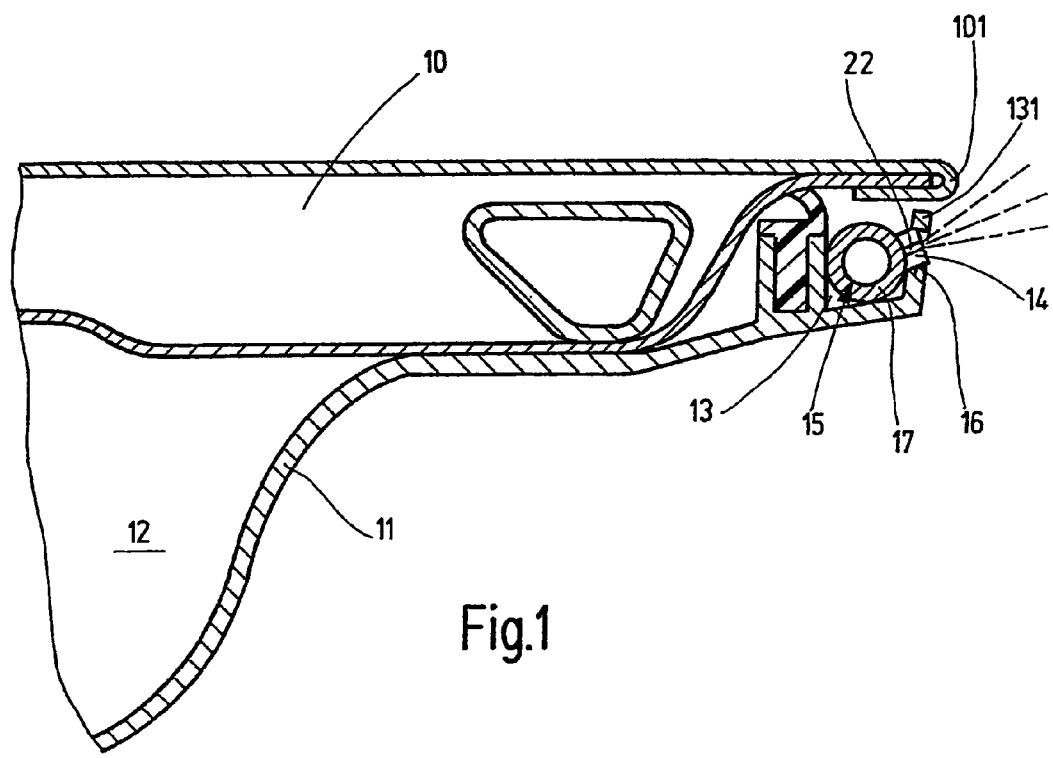
FIG. 1 shows in detail a longitudinal section through the rear region of an engine hood which points toward the windshield of a motor vehicle, in conjunction with a lower cover of an air guiding duct.

FIG. 1 is a sketch of the rear region of a double-walled engine hood 10 whose rear edge 101 runs at a distance from a front windshield (not illustrated here) of the vehicle, below the windshield over the width thereof. In the closed state, the engine hood 10 rests on a plastic part which forms the lower cover 11 for an air supply duct 12. The duct 12 is bounded at the top by the engine hood 10 and is connected to an air inlet opening in the engine hood 10. A U-shaped shaft 13 is integrally formed in the cover 11 at that end of said cover which faces the windshield. The shaft is open at the top and is overlapped by the closed engine hood 10. The shaft 13 extends over the entire width of the windshield and accommodates a washing-fluid line 15 which is populated with washing-fluid nozzles 14. The shaft wall 131 which is relatively close to the windshield has cutouts 16 into which spray openings 22 contained in the washing-fluid nozzles 14 project, so that the washing fluid which is ejected from the spray openings 22 under pressure wets defined zones of the windshield. In the exemplary embodiment, the washing-fluid line 15 is in the form of a flexible hose 17 which is placed in the shaft 13 from above. As an alternative, the washing-fluid line 15 may also be formed by a flow duct which is integrated in the cover 11.

Each washing-fluid nozzle 14, which is situated in the profile of the washing-fluid line 15 or of the hose 17, has an elongate pipe section 18 and a valve housing 19, which is radially attached to the pipe section 18 and may also be of integral design with the pipe section 18. The valve housing 19 is of extremely flat or circular construction with a relatively small diameter and is flange-connected to the pipe section 18 such that its housing axis is oriented parallel to the axis of the pipe section 18. The valve housing 19 is connected to the flow duct present in the interior of the pipe section 18 by means of a wall opening 20 in the pipe section 18. A non-return valve 21 (only symbolically indicated in FIG. 2) and the spray opening 22 in the washing-fluid nozzle 14 are integrated in the valve housing 19. The non-return valve 21, which customarily has a valve member which interacts with a valve seat, and a valve-closing spring, is arranged between a valve inlet chamber 23, which is formed in the valve housing 19, and a valve outlet chamber 24, which is formed in the valve housing 19. The valve inlet chamber 23 and valve outlet chamber 24 are arranged in series in the axial direction of the valve housing 19. The valve inlet chamber 23 overlaps the wall opening 20 in the pipe section 18, and the valve outlet chamber 24 has the spray opening 22.

Figure 3:
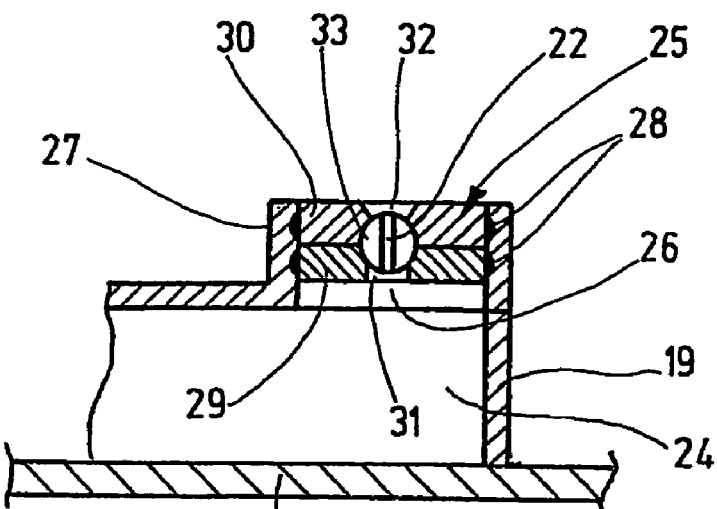
FIG. 3 shows an enlarged illustration of the detail III in FIG. 2.
Figure 4:
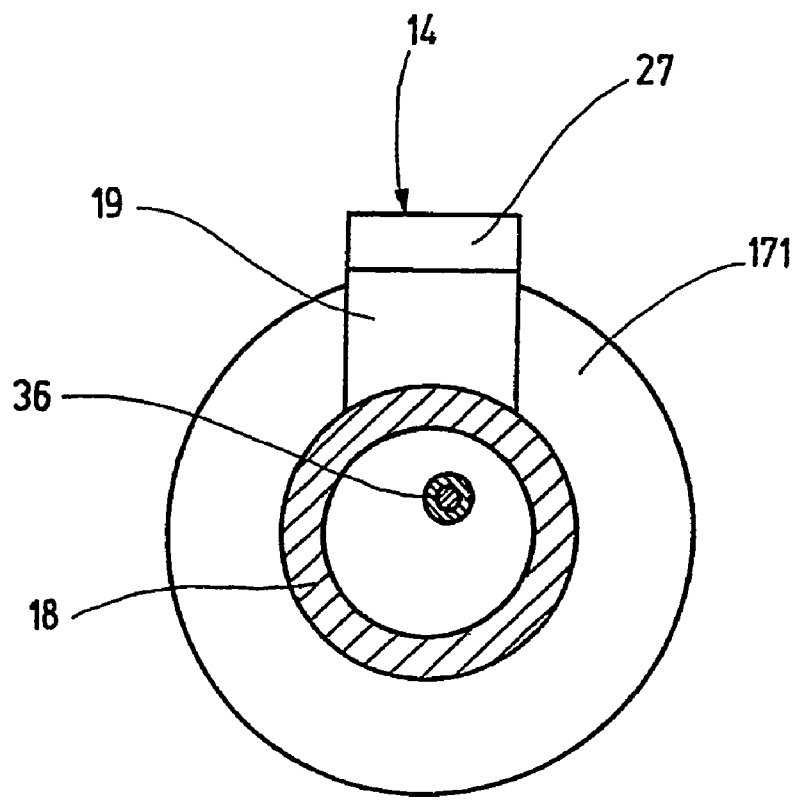
FIG. 4 shows an enlarged illustration of the section IV-IV in FIG. 2.

The spray opening 22 is integrated in a spray module 25 which is inserted as a separate component in a housing opening 26 in the valve housing 19. The normal or axis of the housing opening 26 is in this case oriented at right angles to the housing axis of the valve housing 19 and to the axis of the pipe section 18. As can be seen particularly clearly in the enlarged detail of FIG. 3, the housing opening 26 is surrounded by a collar 27 which is formed on the valve housing 19 is possible for the collar 27 to be of integral design with the valve housing 19. Clip receptacles 28, into which the spray module 25 is clipped, are incorporated in the collar 27.

In the described exemplary embodiment, the spray module 25 comprises a lower module plate 29 and an upper module plate 30. The plates each are provided with a central through-hole 31 or 32, and the two through-holes 31, 32 are aligned with one another. A nozzle body 33 in the form of a ball is firmly and pivotably clamped between the two module plates 31, 32, and the spray opening 22 is formed in said ball in the form of a bore hole which runs through the middle of the ball and communicates with the two through-holes 31, 32. In the described exemplary embodiment, the nozzle body 33 has only one spray opening 22, but it may also be provided with a plurality of spray openings which are offset at an angle with respect to one another.

Figure 2:
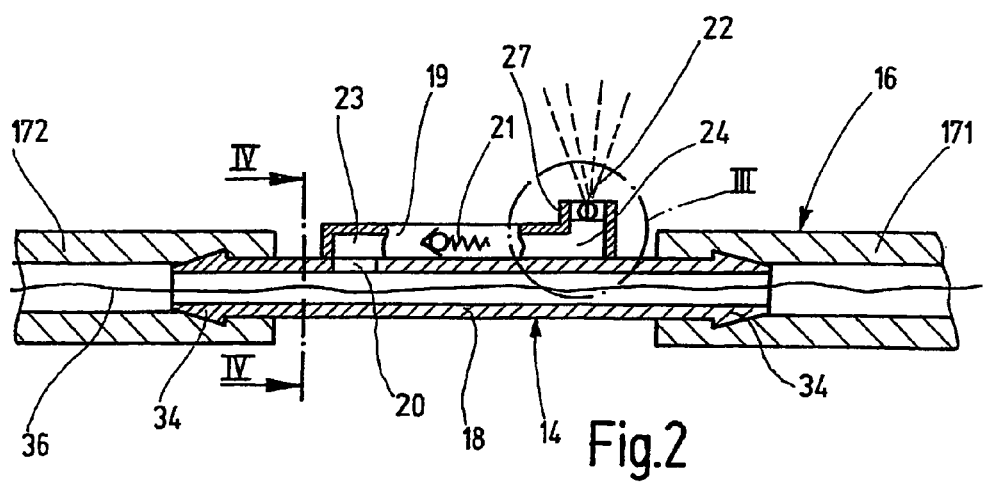
FIG. 2 shows a longitudinal section through a washing-fluid nozzle which is inserted between two line portions of a washing-fluid line.

In order to connect the washing-fluid nozzle 14 to the washing-fluid line 15, the pipe section 18 is inserted into an intersection point of the washing-fluid line 15. If the washing-fluid line 15 is in the form of a hose 17, the pipe section 18 connects two successive hose sections 171 and 172 to one another (FIG. 2). For this purpose, a connection nipple 34 or 35 is formed at each end of the pipe section 18, one end of the hose section 171 or 172 being pushed onto said connection nipple.

A continuous, insulated heating wire 36 runs in the washing fluid flow duct of the washing-fluid line 15 or of the hose 17. This heating wire is also led through the pipe section 18. When the heating wire 36 is connected to a power source, the washing fluid flowing in the washing-fluid line 15 is heated up and therefore freezing is prevented or a washing-fluid line 15 which has frozen is thawed again. The pipe section 18 and the valve housing 19 are produced from a material which conducts heat well so that, on account of the elongate, flat design of the valve housing 19, sufficient amounts of the heat generated by the heating wire 36 still reach the spray module 25 and icing of the spray opening 22 is prevented or eliminated here too.

The invention claimed is:

1. A washing device for a glass pane in a vehicle, comprising:
- a washing-fluid line which runs along a lower edge of the glass pane;
- a washing-fluid nozzle which is connected to the washing-fluid line, the washing-fluid nozzle includes
    - a spray opening,
    - a non-return valve which is arranged upstream of the spray opening,
    - a pipe section,
    - a valve housing which contains the non-return valve and is connected to the outside of the pipe section with its housing axis parallel to the axis of the pipe section, and
    - a spray module in which the spray opening is integrated and which is replaceably inserted in a housing opening of the valve housing and wherein the spray module includes a lower module plate having a through-hole, and an upper module plate having a through-hole, wherein the through-holes are aligned, and wherein the spray module includes a nozzle body which has the spray opening and is pivotably clamped in the through-holes and between the module plates wherein the spray opening is arranged in the valve housing with its opening normal transverse to the housing axis, and wherein the pipe section is inserted into an intersection point of the washing-fluid line.

2. The washing device as claimed in claim 1, wherein the pipe section and the valve housing are composed of a material which conducts heat well, and wherein the washing device comprises a continuous, insulated heating wire that runs inside the washing-fluid line.

3. The washing device as claimed in claim 2, wherein the washing-fluid nozzle further comprises a collar, which is formed on the valve housing and surrounds the housing opening, and wherein the spray module (25) is configured such that it can be clipped into the collar.

4. The washing device as claimed in claim 3, wherein the valve housing includes a valve inlet chamber, which is in direct communication with the interior of the pipe section, and a valve outlet chamber, which is in direct communication with the spray opening, wherein the inlet and outlet chambers are sequentially arranged in the direction of the housing axis, and wherein the non-return valve is arranged between the valve inlet and outlet chambers.

5. The washing device as claimed in claim 4, wherein the pipe section and the valve housing each have an elongated configuration.

6. The washing device as claimed in claim 5, wherein the valve housing is of a generally flat configuration.

7. The washing device as claimed in claim 5, wherein the valve housing is of a generally circular configuration.

8. The washing device as claimed in claim 7, wherein the washing-fluid line includes a flexible hose which has two hose sections that are each connected to one another by the pipe section.

9. The washing device as claimed in claim 8, wherein each end of the pipe section includes a connection nipple, and wherein each nipple is pushed into one of the hose sections.

10. The washing device as claimed in claim 9, wherein the hose is disposed in a shaft, wherein the shaft is open at the top and has a U-shaped cross section, wherein a wall of the shaft, which is close to the glass pane of the vehicle, has a cutout into which the spray opening in the washing-fluid nozzle extends.

11. The washing device as claimed in claim 10, wherein the shaft is an integral part of a cover which, together with a part of an engine hood which rests on said cover, encloses an air supply duct, and wherein the engine hood closes the shaft from above.

12. The washing device as claimed in claim 7, wherein the washing-fluid line is in the form of a duct which is integrated in a cover which, together with a part of an engine hood which rests on said cover, encloses an air supply duct.

13. The washing device as claimed in claim 1, wherein the washing-fluid nozzle further comprises a collar, which is formed on the valve housing and surrounds the housing opening, and wherein the spray module is configured such that it can be clipped into the collar.

14. The washing device as claimed in claim 1, wherein the valve housing includes a valve inlet chamber, which is in direct communication with the interior of the pipe section, and a valve outlet chamber, which is in direct communication with the spray opening, wherein the inlet and outlet chambers are sequentially arranged in the direction of the housing axis, and wherein the non-return valve is arranged between the valve inlet and outlet chambers.

15. The washing device as claimed in claim 1, wherein the pipe section and the valve housing each have an elongated configuration.

16. The washing device as claimed in claim 15, wherein the valve housing is of a generally flat configuration.

17. The washing device as claimed in claim 15, wherein the valve housing is of a generally circular configuration.

18. The washing device as claimed in claim 1, wherein the washing-fluid line includes a flexible hose which has two hose sections that are each connected to one another by the pipe section.

19. The washing device as claimed in claim 18, wherein each end of the pipe section includes a connection nipple, and wherein each nipple is pushed into one of the hose sections.

20. The washing device as claimed in 18, wherein the hose is disposed in a shaft, wherein the shaft is open at the top and has a U-shaped cross section, wherein a wall of the shaft, which is close to the glass pane of the vehicle, has a cutout into which the spray opening in the washing-fluid nozzle extends.

21. The washing device as claimed in claim 20, wherein the shaft is an integral part of a cover which, together with a part of an engine hood which rests on said cover, encloses an air supply duct, and wherein the engine hood closes the shaft from above.

22. The washing device as claimed in claim 1, wherein the washing-fluid line is in the form of a duct which is integrated in a cover which, together with a part of an engine hood which rests on said cover, encloses an air supply duct.

* * * * *